United States Patent
Winterbottom et al.

(10) Patent No.: US 11,999,867 B2
(45) Date of Patent: Jun. 4, 2024

(54) COATING COMPOSITION AND COATED SUBSTRATE

(71) Applicant: SIKA TECHNOLOGY AG, Baar (CH)

(72) Inventors: Gail D. Winterbottom, Shakopee, MN (US); Aditi Chavannavar, Milford, MI (US); Sarah Kay O' Boyle, Livonia, MI (US); Monica Santos-Verbrick, Shakopee, MN (US)

(73) Assignee: SIKA TECHNOLOGY AG, Baar (CH)

( * ) Notice: Subject to any disclaimer, the term of this patent is extended or adjusted under 35 U.S.C. 154(b) by 574 days.

(21) Appl. No.: 16/858,647

(22) Filed: Apr. 26, 2020

(65) Prior Publication Data
US 2020/0377757 A1 Dec. 3, 2020

Related U.S. Application Data

(60) Provisional application No. 62/855,297, filed on May 31, 2019.

(51) Int. Cl.
| | | |
|---|---|---|
| C09D 175/04 | (2006.01) | |
| C08F 220/20 | (2006.01) | |
| C08G 18/08 | (2006.01) | |
| C08G 18/10 | (2006.01) | |
| C08G 18/62 | (2006.01) | |
| C08G 18/73 | (2006.01) | |
| C08L 25/14 | (2006.01) | |
| E04B 2/00 | (2006.01) | |

(52) U.S. Cl.
CPC .......... *C09D 175/04* (2013.01); *C08F 220/20* (2013.01); *C08G 18/0866* (2013.01); *C08G 18/10* (2013.01); *C08G 18/6229* (2013.01); *C08G 18/73* (2013.01); *C08L 25/14* (2013.01); *E04B 2/00* (2013.01); *C08L 2201/52* (2013.01)

(58) Field of Classification Search
CPC combination set(s) only.
See application file for complete search history.

(56) References Cited

U.S. PATENT DOCUMENTS

| | | | |
|---|---|---|---|
| 3,473,951 A | 10/1969 | De et al. | |
| 8,668,988 B2 | 3/2014 | Schoots et al. | |
| 2003/0158328 A1* | 8/2003 | Nabavi | C07C 263/18 524/589 |
| 2005/0064128 A1 | 3/2005 | Lane et al. | |
| 2008/0139775 A1* | 6/2008 | Wu | C08G 18/706 427/385.5 |
| 2009/0054570 A1* | 2/2009 | Wu | C08G 18/706 524/196 |
| 2012/0321899 A1 | 12/2012 | Schoots et al. | |
| 2013/0343822 A1 | 12/2013 | Swarny | |
| 2017/0051121 A1 | 2/2017 | Prissok et al. | |
| 2018/0187043 A1 | 7/2018 | Noatschk et al. | |

FOREIGN PATENT DOCUMENTS

| | | | |
|---|---|---|---|
| AU | 2011202857 A1 | 1/2013 | |
| DE | 1816638 A1 | 10/1969 | |
| DE | 102010015056 A1 | 10/2011 | |
| JP | 2005297200 A1 | 10/2005 | |
| KR | 20160120868 A | 10/2016 | |
| PL | 222698 B1 | 8/2016 | |
| WO | WO-2009029512 A2 * | 3/2009 | ......... C08G 18/6216 |
| WO | 2015165724 A1 | 11/2015 | |
| WO | 2016188655 A1 | 12/2016 | |

OTHER PUBLICATIONS

Neocryl XK-110 Product Data Sheet (Year: 1985).*
Easaqua M 502 = Rhodocoat XEZ-M 502 TDS (Year: 2019).*
Dow Coating Materials (Year: 2011).*

* cited by examiner

*Primary Examiner* — Peter A Salamon
(74) *Attorney, Agent, or Firm* — Oliff PLC

(57) ABSTRACT

A two-component water-based coating composition that exhibits good adherence to the surface of substrates such as polyurethane foam boards. The two-component water-based coating composition is based on acrylic urethane chemistry. Coated substrates, including polyurethane foam boards coated with the two-component water-based acrylic urethane coating composition, wall cladding systems, and building walls incorporating the coated polyurethane foam boards are also disclosed. The coated polyurethane foam boards are water resistant, mold resistant, mildew resistant, UV radiation resistant, lightweight and thermally insulative.

31 Claims, No Drawings

COATING COMPOSITION AND COATED SUBSTRATE

CROSS REFERENCE TO RELATED APPLICATIONS

The present application claims the benefit of the filing date, under 35 U. S.C. §119(e), from U.S. Provisional Application For Patent Ser. No. 62/855,297, filed May 31, 2019, which is hereby incorporated by reference.

TECHNICAL FIELD

The present disclosure relates to a coating composition for a substrate, a substrate coated with a coating composition, a wall cladding system including the coated substrate, building walls including the wall cladding system, and methods of making the coating composition, coated substrate, wall cladding systems, and building walls. The present disclosure more particularly relates to a coating composition for a polyurethane foam board, a polyurethane foam board coated with the coating composition, a wall cladding system including the coated polyurethane foam board, building walls including the wall cladding systems, and methods of making the coating composition, coated polyurethane foam board, wall cladding systems, and building walls.

BACKGROUND

Polyurethane foam boards for residential and industrial wall cladding are light-weight, water resistant, mildew resistant and thermally insulative, and can be produced on an industrial scale. It is widely known that polyurethane foam degrades over time with exposure to the external environment. Polyurethane foam boards must be coated to prevent degradation by ultra-violet (UV) light. It is also desirable to coat polyurethane foam boards for aesthetic purposes.

One problem associated with the coating of polyurethane foam boards is that the current water-based exterior coatings designed for the exterior siding market do not adhere to the polyurethane foam composite siding. In view of the fact that the water-based coatings do not adhere to the polyurethane foam, the industry has resorted to the use of solvent-based coatings to coat polyurethane foam composite board siding. The use of solvent-based coatings continues to be undesirable from a safety, human health and environmental standpoint.

The art still needs a coating composition that adheres to the surface of polyurethane foam boards and panels to provide an effective water-resistant, UV degradation resistant, and aesthetically-pleasing coating, while also minimizing or eliminating the human safety and environmental concerns associated with known solvent-based coatings typically used to coat polyurethane foam composite siding.

SUMMARY

According to a first illustrative aspect, disclosed is a two-component water-based acrylic urethane coating composition comprising a first component and a second component, wherein said first component comprises a hydroxyl functional acrylic polymer emulsion, and wherein said second component comprises a water-emulsifiable isocyanate.

According to another illustrative aspect, additionally disclosed is a coated foam substrate, said coated foam substrate comprising first and second opposite facing major surfaces and a thickness extending between said first and second opposite facing major surfaces, and a coating composition applied to at least a portion of at least one of said first and second opposite facing surfaces of said foam substrate, said coating composition comprising a two-component water-based acrylic urethane coating composition comprising a first component and a second component, wherein said first component comprises a hydroxyl functional acrylic polymer emulsion, and wherein said second component comprises a water-emulsifiable isocyanate. According to certain embodiments, the coated foam substrate comprises a foam board or foam panel.

According to another illustrative aspect, a method of preparing a coated foam substrate comprising applying a coating composition to at least a portion of at least one of a first and second opposite facing surface of a foam substrate comprising first and second opposite facing major surfaces and a thickness extending between said first and second opposite facing major surfaces, said coating composition comprising a two-component water-based acrylic urethane coating composition comprising a first component and a second component, wherein said first component comprises a hydroxyl functional acrylic polymer emulsion, and wherein said second component comprises a water-emulsifiable isocyanate, and at least partially curing said coating composition or allowing said coating composition to at least partially cure. According to certain embodiments, the coated foam substrate comprises a foam board or foam panel.

According to another illustrative aspect, additionally disclosed is a coated polyurethane foam board, said coated polyurethane foam board comprising first and second opposite facing major surfaces and a thickness extending between said first and second opposite facing major surfaces, and an acrylic urethane coating composition applied to at least a portion of at least one of said first and second opposite facing surfaces of said polyurethane foam board, said acrylic urethane coating composition comprising a two-component water-based acrylic urethane coating composition comprising a first component and a second component, wherein said first component comprises a hydroxyl functional acrylic polymer emulsion, and wherein said second component comprises a water-emulsifiable isocyanate.

According to another illustrative aspect, disclosed is a building wall comprising a frame and a coated foam board attached to said frame, said coated foam board having opposite facing first and second surfaces and a thickness extending between said first and second opposite facing surfaces, and an acrylic urethane coating composition adhered to at least a portion of at least one of said first and second opposite facing major surfaces of said foam board, said acrylic urethane coating composition comprising a two-component water-based acrylic urethane coating composition comprising a first component and a second component, wherein said first component comprises a hydroxyl functional acrylic polymer emulsion, and wherein said second component comprises a water-emulsifiable isocyanate.

According to another illustrative aspect, disclosed is a building wall comprising a frame, a building wall substrate attached to said frame, and a coated polyurethane foam board attached to said frame, said coated polyurethane foam board having opposite facing first and second surfaces and a thickness extending between said first and second opposite facing surfaces, and an acrylic urethane coating composition adhered to at least a portion of at least one of said first and second opposite facing major surfaces of said foam board, said acrylic urethane coating composition comprising a two-component water-based polyurethane coating composition comprising a first component and a second component, wherein said first component comprises a hydroxyl functional acrylic polymer emulsion, and wherein said second component comprises a water-emulsifiable isocyanate.

According to another illustrative aspect, disclosed is a method of making a building wall comprising attaching a building wall substrate to a building wall frame, attaching a coated polyurethane foam board to said building wall substrate, said coated polyurethane foam board having opposite facing first and second surfaces and a thickness extending between said first and second opposite facing surfaces, and an acrylic urethane coating composition adhered to at least a portion of at least one of said first and second opposite facing major surfaces of said foam board, said acrylic urethane coating composition comprising a two-component water-based polyurethane coating composition comprising a first component and a second component, wherein said first component comprises a hydroxyl functional acrylic polymer emulsion, and wherein said second component comprises a water-emulsifiable isocyanate.

DETAILED DESCRIPTION

The present disclosure is directed to a two-component water-based coating composition for coating a surface of a building substrate. The two-component water-based coating composition has surprisingly and unexpected good adhesion to the surface of polyurethane foam composite boards and panels. The coating compositions can be formulated at low VOC content, and can be colored to achieve a wide variety of aesthetically pleasing finishes. The coated polyurethane foam composite boards are durable, lightweight, water resistant, mold resistant, UV resistant, and may be recoated with standard exterior house paints.

The term "polyurethane foam composite" as used throughout the present Specification refers to a composition comprising 100 percent by weight of polyurethane polymer, or a composition comprising greater than 0 and less than 100 percent by weight of polyurethane polymer and a further additive or component, based on the total weight of the polyurethane foam composite, that is used to manufacture a board, panel or other building substrate.

The two-component water-based coating composition comprises a first component and a second component. According to certain illustrative embodiments, the coating composition comprises a water-based two-component acrylic urethane composition prepared from a first component and a second component. According to further illustrative embodiments, the first component of the two-component acrylic urethane coating composition comprises a hydroxyl functional acrylic polymer emulsion and a second component comprises a water-emulsifiable isocyanate.

According to certain illustrative embodiments, the first component of the coating composition may comprise a blend of a hydroxyl functional acrylic polymer emulsion and one or more acrylic polymers that are not hydroxyl functional.

The first component comprising the hydroxyl functional acrylic polymer emulsion may be formulated into a first component composition of the acrylic urethane coating composition. The second component comprising the water-emulsifiable isocyanate may be formulated into a second component composition of the acrylic urethane coating composition. According to these illustrative embodiments, the first component composition and the second component composition are blended together to prepare the two-component water-based acrylic urethane coating composition.

The hydroxyl functional acrylic polymer may be prepared by reacting an acrylic monomer with a polyol. Suitable acrylic monomers include acrylic monomers containing hydroxyl groups, such as hydroxyalkyl acrylates including, without limitation, 2-hydroxyethyl acrylate, 2-hydroxyethyl methacrylate, hydroxypropyl methacrylate, hydroxypropyl acrylate and the like; esters of acrylic acid or methacrylic acid, including cycloalkyl esters of acrylic acid or methacrylic acid, such as methyl acrylate, ethyl acrylate, propyl acrylate, isopropyl acrylate, butyl acrylate, hexyl acrylate, octyl acrylate, acrylate, cyclohexyl acrylate, methyl methacrylate, ethyl methacrylate; propyl methacrylate, isopropyl methacrylate, butyl methacrylate; hexyl methacrylate, octyl methacrylate, lauryl methacrylate, cyclohexyl methacrylate, and the like; alkoxyalkyl esters of acrylic acid or methacrylic acid, such as methoxybutyl acrylate, methoxybutyl methacrylate, methoxyethyl acrylate, methoxyethyl methacrylate, ethoxy butyl acrylate, ethoxylbutyl methacrylate; and the like; vinyl aromatic compounds such as styrene and a-methyl styrene; and ethylenically unsaturated acrylic acid and methacrylic acid. Useful polyols include those polyols having at least one functionality reactive with an acrylic-containing compound. Without limitation suitable polyols useful in preparing the hydroxyl functional acrylic polymer include polyether polyols, polyester polyols, polyalkylene glycols, polybutadiene polyols.

The second component of the coating composition comprises at least one water-emulsifiable isocyanate. The at least one water-emulsifiable isocyanate may be selected from water-emulsifiable monomeric isocyanates, diisocyanates, triisocyanates, oligomeric isocyanates, polymeric isocyanates (ie, polyisocyanates) and mixtures thereof. The water-emulsifiable isocyanate is selected from water-emulsifiable aliphatic isocyanates, water-emulsifiable cycloaliphatic isocyanates, water-emulsifiable araliphatic isocyanates and mixtures thereof. According to certain illustrative embodiments, the water-emulsifiable isocyanate comprises a water-emulsifiable aliphatic isocyanate. The water-emulsifiable isocyanate may comprise hexamethylene diisocyanate.

Water-emulsifiable aliphatic isocyanates that may be used as the second component used to prepare the acrylic urethane adhesive composition include, for example, hexamethylene diisocyanates (HDI), hexamethylene diisocyanate trimers (HDI Trimers), dicyclohexylmethane diisocyanates ($H_{12}$MDI), modified hexymethylene diisocyanates, isophorone diisocyanates (IPDI), cyclohexane diisocyanate (CHDI), tetramethylxylylene diisocyanate (TMXDI) or mixtures thereof.

According to certain illustrative embodiments, the at least one water-emulsifiable isocyanate may be provided in a solvent. The solvent may be present for the purpose of diluting water-emulsifiable isocyanate to lower the initial viscosity of the isocyanate. Suitable solvents include, for example, propylene carbonate, butyl glycol acetate, butyl diglycol acetate and methoxypropyl acetate.

According to certain illustrative embodiments, the hydroxyl functional acrylic polymer emulsion comprising the first component may comprise a styrene-acrylic acid copolymer emulsion, and the water-emulsifiable isocyanate of the second component comprises at least one water-emulsifiable isocyanate in solvent.

According to other illustrative embodiments, the hydroxyl functional acrylic polymer emulsion comprising the first component may comprise a styrene-acrylic acid copolymer emulsion, and the water-emulsifiable isocyanate of the second component comprises at least one water-emulsifiable isocyanate in solvent.

According to certain illustrative embodiments, the hydroxyl functional acrylic polymer emulsion comprising the first component may comprise a styrene-acrylic acid copolymer emulsion, and the water-emulsifiable isocyanate of the second component comprises hexamethylene diisocyanate in solvent. The styrene-acrylic acid copolymer emulsion may comprise from about 40 to about 50 weight percent styrene-acrylic acid copolymer resin solids and from about 50 to about 60 weight percent water. The water-emulsifiable isocyanate may comprise from about 50 to about 80 weight percent of isocyanate and from about 20 to about 50 weight percent solvent. Without limitation, a suitable styrene-acrylic acid copolymer emulsion is commercially available from BASF Corporation under the trade designation JONCRYL OH 8314. Without limitation, a suitable water-emulsifiable isocyanate is commercially available from BASF Corporation under BASONAT HW 1180 PC.

In addition to the first part component of the hydroxyl functional acrylic polymer emulsion, the first component composition may include at least one further additive. The at least one additive may be selected from a wide variety of additives that are known to be included in urethane coating compositions. Without limitation, any only by way of illustration, suitable examples of additives that may be included in the first component composition include defoamers, dispersants, fillers, pigments, rheology modifiers, surfactants and mixtures thereof.

Suitable filler includes a material that may be a solid and is inert to other materials in the formulation. The filler may comprise inorganic filler, organic filler and a combination of inorganic and organic fillers. The inorganic fillers may comprise inorganic mineral fillers. For purposes of illustration, but not by way of limitation, the filler may comprise at least one of organic fibers, inorganic fibers, rubber particles, cork particles, carbon black, glass, crushed glass, glass spheres, iron particles, quartz, silica, amorphous precipitated silica, fumed silica, kaolin, mica, diatomaceous earth, talc, zeolites, clays, aluminum hydroxide, aluminum sulfate, barium sulfate, calcium sulfate, calcium carbonate, dolomite, limestone, wollastonite, nepheline syenite, perlite, flint powder, kryolite, alumina, alumina trihydrate, organic polymer granules, organic polymer powders, and mixtures thereof.

The acrylic urethane coating composition may include a pigment. The pigment may be selected from inorganic pigments, organic pigments, or mixtures of inorganic and organic pigments. Without limitation, any only by way of illustration, suitable examples of inorganic pigments include red iron oxide, yellow iron oxide, black iron oxide, brown iron oxide, titanium dioxide, zinc oxide, zirconium oxide, cerium oxide, chromium oxide, chromium hydroxide, chromium hydrate, manganese violet, ferric ferrocyanide, guanine (natural pearl) mica, sericite, talc, magnesium carbonate, calcium carbonate, alumina hydroxide, barium sulfate, bronze powder, (metallic), copper powder (metallic), silver powder (metallic), gold powder (metallic), and the like. Without limitation, and only by way of illustration, suitable examples of organic pigments include azo pigments, lake pigments, phthaloryanine pigments, quinacridone pigments, diazine pigments, perylene red pigment, isoindolinone-based pigments and the like.

Suitable commercially available colorants include Pure-Options™ B Lamp Black, BI Blue, C yellow oxide, D, DU phthalo green, E, EU phthalo blue, F red oxide, I brown oxide, KX white, L raw umber, and YE yellow exterior from BASF Corporation. Other suitable commercially available colorants include COLORTREND® 808-0018 KX titanium white, 808-1034 F red iron oxide, 808-1572 I brown oxide, 808-1810 C yellow iron oxide, 808-2009 L raw umber, 808-5511 D phthalo green, 808-7214 E phthalo blue and 808-9907 B lamp black from Chromaflo Technologies.

The coating composition may also include a defoamer. Suitable examples of defoamers include but are not limited to silicone defoamers, mineral oil/silica defoamers, low surface tension additives and mixtures thereof. Examples of silicone defoamers composition include but are not limited to polysiloxane solutions and non-aqueous emulsions of polysiloxanes. Examples of polysiloxane solutions which may be used as a defoamer include but are not limited to a cyclohexanone polysiloxane solution, a diisobutylketone polysiloxane solution and mixtures thereof. An example of a non-aqueous polysiloxane emulsion which may be used as a defoamer is a polysiloxane propylene glycol emulsion. In certain embodiments, the defoamer is a diisobutylketone polysiloxane solution commercially available from BYK Chemie GmbH (Wesel, Germany) under the trademarks BYK®-066N, BYK®-070, BYK®-077, BYK®-A500. In other embodiments, the defoamer is a silicone defoamer commercially available from Cognis (Monheim, Germany) under the trademark DEHYDRAN® 1208.

UV stabilizers may also be used within the coating composition. UV stabilizers may comprise 2-(2'-hydroxyphenyl)benzotriazoles, commercially available under the trademark Ciba® Tinuvin® 328 from BASF SE (Ludwigshafen, Germany); 2-hydroxybenzophenones such as Methanone, [2-hydroxy-4-(octyloxy)phenyl]phenyl, commercially available under the trademark Ciba® Chimassorb® 81 from BASF SE (Ludwigshafen, Germany); esters of substituted and unsubstituted benzoic acids; acrylates; nickel compounds; Hindered Amine Light Stabilizers ("HALS") such as methyl 1,2,2,6,6-pentamethyl-4-piperidyl sebacate, bis(1,2,2,6,6-pentamethyl-4-piperidyl)sebacate+ methyl 1,2,2,6,6-pentamethyl-4-piperidyl sebacate, bis(2,2, 6,6-tetramethyl-4-piperidyl)sebacate, polymer of butanedioic acid dimethylester with 4-hydroxy-2,2,6,6-tetramethyl-1-piperidine ethanol, bis(1,2,2,6,6-pentamethyl-4-piperidinyl)-2-butyl-2-(4-hydroxy-3,5-di-tert-butylbenzyl)propanedioate; sterically hindered amines, oxanilides; 2-(2-hydroxyphenyl)-1,3,5-triazines; and mixtures thereof. A suitable but non-limiting example of a UV stabilizer which may be used in the coating composition is PolyStab 100 commercially available from The Hanson Group LLC (Duluth, GA).

According to certain illustrative embodiments, the hydroxyl functional acrylic polymer emulsion may be included in the first component composition in an amount from about 40 to about 80 percent by weight. According to other embodiment the hydroxyl functional acrylic polymer emulsion may be included in the first component composition in an amount from about 50 to about 80 percent by weight. According to other embodiment the hydroxyl functional acrylic polymer emulsion may be included in the first component composition in an amount from about 60 to about 80 percent by weight. According to other embodiment the hydroxyl functional acrylic polymer emulsion may be included in the first component composition in an amount from about 70 to about 80 percent by weight. According to other embodiment the hydroxyl functional acrylic polymer emulsion may be included in the first component composition in an amount from about 40 to about 70 percent by weight. According to other embodiment the hydroxyl functional acrylic polymer emulsion may be included in the first component composition in an amount from about 50 to about 70 percent by weight. According to other embodiment the hydroxyl functional acrylic polymer emulsion may be included in the first component composition in an amount from about 60 to about 70 percent by weight. According to other embodiment the hydroxyl functional acrylic polymer emulsion may be included in the first component composition in an amount from about 55 to about 70 percent by weight. According to other embodiment the hydroxyl functional acrylic polymer emulsion may be included in the first component composition in an amount from about 60 to about 70 percent by weight. According to other embodiment the hydroxyl functional acrylic polymer emulsion may be included in the first component composition in an amount from about 65 to about 70 percent by weight. According to other embodiment the hydroxyl functional acrylic polymer emulsion may be included in the first component composition in an amount from about 55 to about 60 percent by weight.

According to certain illustrative embodiments, at least one defoamer may be included in the first component composition in an amount of greater than 0 to about 1 percent by weight. According to other illustrative embodiments, at least one defoamer may be included in the first component composition in an amount of about 0.1 to about 1 percent by weight. According to other illustrative embodiments, at least one defoamer may be included in the first component composition in an amount of about 0.1 to about 0.9 percent by weight. According to other illustrative embodiments, at least one defoamer may be included in the first component composition in an amount of about 0.1 to about 0.8 percent by weight. According to other illustrative embodiments, at least one defoamer may be included in the first component composition in an amount of about 0.1 to about 0.7 percent by weight. According to other illustrative embodiments, at least one defoamer may be included in the first component composition in an amount of about 0.1 to about 0.6 percent by weight. According to other illustrative embodiments, at least one defoamer may be included in the first component composition in an amount of about 0.1 to about 0.5 percent by weight. According to other illustrative embodiments, at least one defoamer may be included in the first component composition in an amount of about 0.1 to about 0.4 percent by weight. According to other illustrative embodiments, at least one defoamer may be included in the first component composition in an amount of about 0.1 to about 0.3 percent by weight. According to other illustrative embodiments, at least one defoamer may be included in the first component composition in an amount of about 0.1 to about 0.2 percent by weight. According to other illustrative embodiments, at least one defoamer may be included in the first component composition in an amount of about 0.2 to about 1 percent by weight. According to other illustrative embodiments, at least one defoamer may be included in the first component composition in an amount of about 0.3 to about 1 percent by weight. According to other illustrative embodiments, at least one defoamer may be included in the first component composition in an amount of about 0.4 to about 1 percent by weight. According to other illustrative embodiments, at least one defoamer may be included in the first component composition in an amount of about 0.5 to about 1 percent by weight. According to other illustrative embodiments, at least one defoamer may be included in the first component composition in an amount of about 0.6 to about 1 percent by weight. According to other illustrative embodiments, at least one defoamer may be included in the first component composition in an amount of about 0.7 to about 1 percent by weight. According to other illustrative embodiments, at least one defoamer may be included in the first component composition in an amount of about 0.8 to about 1 percent by weight. According to other illustrative embodiments, at least one defoamer may be included in the first component composition in an amount of about 0.9 to about 1 percent by weight.

According to certain illustrative embodiments, at least one dispersant may be included in the first component composition in an amount of greater than 0 to about 2 percent by weight. According to other illustrative embodiments, at least one dispersant may be included in the first component composition in an amount of about 0.1 to about 2 percent by weight. According to other illustrative embodiments, at least one dispersant may be included in the first component composition in an amount of about 0.25 to about 2 percent by weight. According to other illustrative embodiments, at least one dispersant may be included in the first component composition in an amount of about 0.5 to about 2 percent by weight. According to other illustrative embodiments, at least one dispersant may be included in the first component composition in an amount of about 0.75 to about 2 percent by weight. According to other illustrative embodiments, at least one dispersant may be included in the first component composition in an amount of about 1 to about 2 percent by weight. According to other illustrative embodiments, at least one dispersant may be included in the first component composition in an amount of about 1.25 to about 2 percent by weight. According to other illustrative embodiments, at least one dispersant may be included in the first component composition in an amount of about 1.5 to about 2 percent by weight. According to other illustrative embodiments, at least one dispersant may be included in the first component composition in an amount of about 1.75 to about 2 percent by weight. According to other illustrative embodiments, at least one dispersant may be included in the first component composition in an amount of about 1 to about 1.1 percent by weight. According to other illustrative embodiments, at least one dispersant may be included in the first component composition in an amount of about 1 to about 1.25 percent by weight. According to other illustrative embodiments, at least one dispersant may be included in the first component composition in an amount of about 1 to about 1.5 percent by weight. According to other illustrative embodiments, at least one dispersant may be included in the first component composition in an amount of about 1 to about 1.75 percent by weight.

According to certain illustrative embodiments, at least one filler may be included in the first component composition in an amount of about 5 to about 25 percent by weight. According to other illustrative embodiments, at least one filler may be included in the first component composition in an amount of about 5 to about 20 percent by weight. According to certain illustrative embodiments, at least one filler may be included in the first component composition in an amount of about 5 to about 15 percent by weight. According to certain illustrative embodiments, at least one filler may be included in the first component composition in an amount of about 5 to about 10 percent by weight. According to certain illustrative embodiments, at least one filler may be included in the first component composition in an amount of about 10 to about 25 percent by weight. According to certain illustrative embodiments, at least one filler may be included in the first component composition in an amount of about 10 to about 20 percent by weight. According to certain illustrative embodiments, at least one filler may be included in the first component composition in an amount of about 10 to about 15 percent by weight.

According to certain illustrative embodiments, at least one filler may be included in the first component composition in an amount of about 15 to about 25 percent by weight. According to certain illustrative embodiments, at least one filler may be included in the first component composition in an amount of about 20 to about 25 percent by weight. According to certain illustrative embodiments, at least one filler may be included in the first component composition in an amount of about 5 to about 20 percent by weight. According to certain illustrative embodiments, at least one filler may be included in the first component composition in an amount of about 15 to about 20 percent by weight.

According to certain illustrative embodiments, at least one pigment may be included in the first component composition in an amount of 0 to about 15 percent by weight. According to certain illustrative embodiments, at least one filler may be included in the first component composition in an amount of about 1 to about 15 percent by weight. According to certain illustrative embodiments, at least one filler may be included in the first component composition in an amount of about 2.5 to about 15 percent by weight. According to certain illustrative embodiments, at least one filler may be included in the first component composition in an amount of about 5 to about 15 percent by weight. According to certain illustrative embodiments, at least one filler may be included in the first component composition in an amount of about 7.5 to about 15 percent by weight. According to certain illustrative embodiments, at least one filler may be included in the first component composition in an amount of about 10 to about 15 percent by weight. According to certain illustrative embodiments, at least one filler may be included in the first component composition in an amount of about 11 to about 15 percent by weight. According to certain illustrative embodiments, at least one filler may be included in the first component composition in an amount of about 12 to about 15 percent by weight. According to certain illustrative embodiments, at least one filler may be included in the first component composition in an amount of about 13 to about 15 percent by weight. According to certain illustrative embodiments, at least one filler may be included in the first component composition in an amount of about 14 to about 15 percent by weight.

According to certain illustrative embodiments, at least one rheology modifier may be included in the first component composition in an amount of greater than 0 to about 1 percent by weight. According to other illustrative embodiments, at least one rheology modifier may be included in the first component composition in an amount of about 0.1 to about 1 percent by weight. According to other illustrative embodiments, at least one rheology modifier may be included in the first component composition in an amount of about 0.1 to about 0.9 percent by weight. According to other illustrative embodiments, at least one rheology modifier may be included in the first component composition in an amount of about 0.1 to about 0.8 percent by weight. According to other illustrative embodiments, at least one rheology modifier may be included in the first component composition in an amount of about 0.1 to about 0.7 percent by weight. According to other illustrative embodiments, at least one rheology modifier may be included in the first component composition in an amount of about 0.1 to about 0.6 percent by weight. According to other illustrative embodiments, at least one rheology modifier may be included in the first component composition in an amount of about 0.1 to about 0.5 percent by weight. According to other illustrative embodiments, at least one rheology modifier may be included in the first component composition in an amount of about 0.1 to about 0.4 percent by weight. According to other illustrative embodiments, at least one rheology modifier may be included in the first component composition in an amount of about 0.1 to about 0.3 percent by weight. According to other illustrative embodiments, at least one rheology modifier may be included in the first component composition in an amount of about 0.1 to about 0.2 percent by weight. According to other illustrative embodiments, at least one rheology modifier may be included in the first component composition in an amount of about 0.2 to about 1 percent by weight. According to other illustrative embodiments, at least one rheology modifier may be included in the first component composition in an amount of about 0.3 to about 1 percent by weight. According to other illustrative embodiments, at least one rheology modifier may be included in the first component composition in an amount of about 0.4 to about 1 percent by weight. According to other illustrative embodiments, at least one rheology modifier may be included in the first component composition in an amount of about 0.5 to about 1 percent by weight. According to other illustrative embodiments, at least one rheology modifier may be included in the first component composition in an amount of about 0.6 to about 1 percent by weight. According to other illustrative embodiments, at least one rheology modifier may be included in the first component composition in an amount of about 0.7 to about 1 percent by weight. According to other illustrative embodiments, at least one rheology modifier may be included in the first component composition in an amount of about 0.8 to about 1 percent by weight. According to other illustrative embodiments, at least one rheology modifier may be included in the first component composition in an amount of about 0.9 to about 1 percent by weight.

According to certain illustrative embodiments, at least one surfactant may be included in the first component composition in an amount of greater than 0 to 1 percent by weight. According to certain illustrative embodiments, at least one surfactant may be included in the first component composition in an amount of about 0.1 to 1 percent by weight. According to certain illustrative embodiments, at least one surfactant may be included in the first component composition in an amount of about 0.2 to 1 percent by weight. According to certain illustrative embodiments, at least one surfactant may be included in the first component composition in an amount of about 0.3 to 1 percent by weight. According to certain illustrative embodiments, at least one surfactant may be included in the first component composition in an amount of about 0.4 to 1 percent by weight. According to certain illustrative embodiments, at least one surfactant may be included in the first component composition in an amount of about 0.5 to 1 percent by weight. According to certain illustrative embodiments, at least one surfactant may be included in the first component composition in an amount of about 0.6 to 1 percent by weight. According to certain illustrative embodiments, at least one surfactant may be included in the first component composition in an amount of about 0.7 to 1 percent by weight. According to certain illustrative embodiments, at least one surfactant may be included in the first component composition in an amount of about 0.8 to 1 percent by weight. According to certain illustrative embodiments, at least one surfactant may be included in the first component composition in an amount of about 0.9 to 1 percent by weight. According to certain illustrative embodiments, at least one surfactant may be included in the first component composition in an amount of about 0.25 to 0.75 percent by weight. According to certain illustrative embodiments, at least one surfactant may be included in the first component composition in an amount of about 0.5 to 0.75 percent by weight.

According to certain illustrative embodiments, water may be included in the first component composition in an amount of about 5 to about 25 percent by weight. According to other illustrative embodiments, water may be included in the first component composition in an amount of about 5 to about 20 percent by weight. According to certain illustrative embodiments, water may be included in the first component composition in an amount of about 5 to about 15 percent by weight. According to certain illustrative embodiments, water may be included in the first component composition in an amount of about 5 to about 10 percent by weight. According to certain illustrative embodiments, water may be included in the first component composition in an amount of about 10 to about 25 percent by weight. According to certain illustrative embodiments, water may be included in the first component composition in an amount of about 10 to about 20 percent by weight. According to certain illustrative embodiments, water may be included in the first component composition in an amount of about 10 to about 15 percent by weight. According to certain illustrative embodiments, water may be included in the first component composition in an amount of about 15 to about 25 percent by weight. According to certain illustrative embodiments, water may be included in the first component composition in an amount of about 20 to about 25 percent by weight. According to certain illustrative embodiments, water may be included in the first component composition in an amount of about 5 to about 20 percent by weight. According to certain illustrative embodiments, water may be included in the first component composition in an amount of about 15 to about 20 percent by weight.

According to certain embodiments, the first component composition of the acrylic urethane coating composition comprises an emulsion containing the first part and other desired additives, and the second component composition of the acrylic urethane composition comprises a water-emulsifiable isocyanate in a solvent. The first component composition and the second component composition are combined together to prepare the two-component water-based acrylic urethane composition. The first component composition may be combined with the second component composition at a ratio of about 1 part of the first component composition to about 10 parts of the second composition by volume to prepare the acrylic urethane coating composition. According to certain illustrative embodiments, first component composition may be combined with the second component composition at a ratio of about 2 parts of the first component composition to about 1 part of the second composition by volume to prepare the acrylic urethane coating composition. According to other illustrative embodiments, first component composition may be combined with the second component composition at a ratio of about 4 parts of the first component composition to about 1 part of the second composition by volume to prepare the acrylic urethane coating composition. According to other illustrative embodiments, first component composition may be combined with the second component composition at a ratio of about 5 parts of the first component composition to about 1 part of the second composition by volume to prepare the acrylic urethane coating composition. According to other illustrative embodiments, first component composition may be combined with the second component composition at a ratio of about 6 parts of the first component composition to about 1 part of the second composition by volume to prepare the acrylic urethane coating composition. According to other illustrative embodiments, first component composition may be combined with the second component composition at a ratio of about 7 parts of the first component composition to about 1 part of the second composition by volume to prepare the acrylic urethane coating composition. According to other illustrative embodiments, first component composition may be combined with the second component composition at a ratio of about 8 parts of the first component composition to about 1 part of the second composition by volume to prepare the acrylic urethane coating composition.

According to certain illustrative embodiments, the density of the first component composition is in the range of about 1 to about 1.5 kg/L. According to certain illustrative embodiments, the density of the first component composition is in the range of about 1.1 to about 1.5 kg/L. According to certain illustrative embodiments, the density of the first component composition is in the range of about 1.25 to about 1.5 kg/L. According to certain illustrative embodiments, the density of the first component composition is in the range of about 1.3 to about 1.5 kg/L. According to certain illustrative embodiments, the density of the first component composition is in the range of about 1.4 to about 1.5 kg/L. According to certain illustrative embodiments, the density of the first component composition is in the range of about 1.15 to about 1.3 kg/L. According to certain illustrative embodiments, the density of the first component composition is in the range of about 1.2 to about 1.3 kg/L.

According to certain illustrative embodiments, the solids content of the first component composition is from about 45 to about 55 percent by weight. According to certain illustrative embodiments, the solids content of the first component composition is from about 45 to about 50 percent by weight. According to certain illustrative embodiments, the solids content of the first component composition is from about 50 to about 55 percent by weight. According to certain illustrative embodiments, the solids content of the first component composition is from about 47.5 to about 55 percent by weight. According to certain illustrative embodiments, the solids content of the first component composition is from about 47.5 to about 50 percent by weight.

According to certain illustrative embodiments, the solids content of the first component composition is from about 38 to about 40 percent by volume. According to certain illustrative embodiments, the solids content of the first component composition is from about 38.5 to about 50 percent by volume. According to certain illustrative embodiments, the solids content of the first component composition is from about 39 to about 40 percent by volume. According to certain illustrative embodiments, the solids content of the first component composition is from about 39.5 to about 40 percent by volume.

According to certain illustrative embodiments, the volatile organic content (VOC) of the first component composition is less than 100. VOC is reported in g/L minus water and exempt solvents. According to certain illustrative embodiments, the volatile organic content (VOC) of the first component composition is less than 50. According to certain illustrative embodiments, the volatile organic content (VOC) of the first component composition is less than 40. According to certain illustrative embodiments, the volatile organic content (VOC) of the first component composition is less than 30. According to certain illustrative embodiments, the volatile organic content (VOC) of the first component composition is less than 20. According to certain illustrative embodiments, the volatile organic content (VOC) of the first component composition is less than 10.

According to certain illustrative embodiments, the density of a mixture of the first and second component compositions is in the range of about 1 to about 1.3 kg/L. According to certain illustrative embodiments, the density of the first component composition is in the range of about 1.1 to about 1.3 kg/L. According to certain illustrative embodiments, the density of the first component composition is in the range of about 1.2 to about 1.3 kg/L. According to certain embodiments, the average density of the mixture of the first and second component compositions is about 1.25.

According to certain illustrative embodiments, the solids content of a mixture of the first and second component compositions is from about 50 to about 55 percent by weight. According to certain illustrative embodiments, the solids content of a mixture of the first and second component compositions is from about 51 to about 55 percent by weight. According to certain illustrative embodiments, the solids content of a mixture of the first and second component compositions is from about 52 to about 55 percent by weight. According to certain illustrative embodiments, the solids content of a mixture of the first and second component compositions is from about 53 to about 55 percent by weight. According to certain illustrative embodiments, the solids content of a mixture of the first and second component compositions is from about 54 to about 55 percent by weight.

According to certain illustrative embodiments, the solids content of a mixture of the first and second component compositions is from about 40 to about 45 percent by volume. According to certain illustrative embodiments, the solids content of a mixture of the first and second component compositions is from about 41 to about 45 percent by volume. According to certain illustrative embodiments, the solids content of a mixture of the first and second component compositions is from about 42 to about 45 percent by volume. According to certain illustrative embodiments, the solids content of a mixture of the first and second component compositions is from about 43 to about 45 percent by volume. According to certain illustrative embodiments, the solids content of a mixture of the first and second component compositions is from about 44 to about 45 percent by volume. According to certain illustrative embodiments, the solids content of a mixture of the first and second component compositions is from about 42 to about 44 percent by volume. According to certain illustrative embodiments, the solids content of a mixture of the first and second component compositions is from about 43 to about 44 percent by volume.

According to certain illustrative embodiments, the water-based polyurethane coating composition comprises at least one filler. The at least one filler maybe present in the coating composition in an amount from about 0 to about 60 weight percent based on the total weight of the composition. According to certain illustrative embodiments, the composition comprises at least one filler in an amount from about 1 to about 50 weight percent based on the total weight of the composition. According to certain illustrative embodiments, the composition comprises at least one filler in an amount from about 1 to about 40 weight percent based on the total weight of the composition. According to certain illustrative embodiments, the composition comprises at least one filler in an amount from about 1 to about 30 weight percent based on the total weight of the composition. According to certain illustrative embodiments, the composition comprises at least one filler in an amount from about 10 to about 30 weight percent based on the total weight of the composition. According to certain illustrative embodiments, the reactive resin composition comprises at least one filler in an amount from about 15 to about 25 weight percent based on the total weight of the composition. According to certain illustrative embodiments, the composition comprises at least one filler in an amount from about 5 to about 55 weight percent based on the total weight of the composition. According to certain illustrative embodiments, the composition comprises at least one filler in an amount from about 10 to about 50 weight percent based on the total weight of the composition. According to certain illustrative embodiments, the composition comprises at least one filler in an amount from about 15 to about 45 weight percent based on the total weight of the composition. According to certain illustrative embodiments, the composition comprises at least one filler in an amount from about 20 to about 40 weight percent based on the total weight of the composition. According to certain illustrative embodiments, the composition comprises at least one filler in an amount from about 25 to about 35 weight percent based on the total weight of the composition. According to certain illustrative embodiments, the composition comprises at least one filler in an amount from about 20 to about 30 weight percent based on the total weight of the composition.

It should be understood that when a range of values is described in the present disclosure, it is intended that any and every value within the range, including the end points, is to be considered as having been disclosed. For example, the amount of a component in "a range of from about 1 to about 100" is to be read as indicating each and every possible amount of that component between 1 and 100. It is to be understood that the inventors appreciate and understand that any and all amounts of components within the range of amounts of components are to be considered to have been specified, and that the inventors have possession of the entire range and all the values within the range.

In the present disclosure, the term "about" used in connection with a value is inclusive of the stated value and has the meaning dictated by the context. For example, the term "about" includes at least the degree of error associated with the measurement of the particular value. One of ordinary skill in the art would understand the term "about" is used herein to mean that an amount of "about" of a recited value results the desired degree of effectiveness in the coating compositions and methods of the present disclosure. One of ordinary skill in the art would further understand that the metes and bounds of the term "about" with respect to the value of a percentage, amount or quantity of any component in an embodiment can be determined by varying the value, determining the effectiveness of the compositions for each value, and determining the range of values that produce compositions with the desired degree of effectiveness in accordance with the present disclosure. The term "about" is further used to reflect the possibility that a composition may contain trace components of other materials that do not alter the effectiveness of the coating composition, articles coated with the coating composition, and systems including or incorporating articles coated with the disclosed coating composition.

EXAMPLES

The following examples are set forth merely to further illustrate the coating composition coated substrate, wall cladding systems, building walls, and methods of making the coating composition, coated substrate, wall cladding systems, and building walls. The illustrative examples should not be construed as limiting the coating composition, coated substrates, cladding systems, building walls, or methods of making the coating composition, coated substarte, wall cladding systems, and building walls in any manner.

Test Method—Adhesion Test

A wet adhesion test was performed in accordance to ASTM D3359 Test Method A, X-Cut Tape Test. A sample substrate was coated with the coating composition and placed in water. The sample was removed from the water and patted dry with a paper towel. Using a sharp razor blade and a metal straightedge, two cuts were made through the coating and substrate that intersected near their middle to form an X. A piece of Permacel tape was placed over the X and smoothed into place by using the eraser end of a pencil. Within 90±30 seconds of application, the tape was removed by pulling it off rapidly. The X-cut area was inspected for removal of the coating from the substrate and was rated in accordance to the following scale:

| ASTM D3359 adhesion ranking scale | |
|---|---|
| 5A | No peeling or removal |
| 4A | Trace peeling or removal along incisions or at their intersection |
| 3A | Jagged removal along incisions up to 1.6 mm (1/16 in.) on either side |
| 2A | Jagged removal along most of incisions up to 3.2 mm (1/8 in.) on either side |
| 1A | Removal from most of the area of the X under the tape |
| 0A | Removal beyond the area of the X |

Example 1

A first component composition of the two-part water-based acrylic urethane coating composition was prepared. The first component included 57 weight percent JONCRYL OH 8314 hydroxyl functional acrylic polymer emulsion, 0.2 weight percent FoamStar SI 2292 NC defoamer, 1.5 weight percent Disperbyk 190 dispersant, 12.5 weight percent TI-Pure R-902+ TiO2 pigment, 11.8 weight percent MINEX #10 filler, 0.8 weight percent Hydropalat WE 3220 surfactant, 0.2 weight percent Rheovis PU 1250 NC rheology modifier, and 16 weight percent water. This sample of the first component of the two-component acrylic urethane coating was tinted to off-white using PureOptions™ Colorants. The tinted first component composition comprised of 0.075% PureOptions™ B, 0.075% PureOptions™ C, 0.075% PureOptions™ I, and 99.775% of the first component composition, by weight. The tinted first component composition was blended with a second component comprising Basonat HW1180 PC water-emulsifiable aliphatic isocyanate at a mix ratio of 4:1 by volume. The textured side of a polyurethane foam composite board was wiped down with a soft cloth. Then, using a foam brush the coating composition was applied to the textured side of the polyurethane foam composite board with a foam brush. The coating composition was dried at ambient temperature for 5 minutes and then was placed in a 70° C. oven for 7 minutes. The coated polyurethane foam composite board was maintained overnight at room temperature. The dry adhesion of the coated polyurethane foam composite board was evaluated. The results appear in Table below.

Example 2

A first component composition of the two-part water-based acrylic urethane coating composition was prepared. The first component included 57 weight percent JONCRYL OH 8314 hydroxyl functional acrylic polymer emulsion, 0.2 weight percent FoamStar SI 2292 NC defoamer, 1.5 weight percent Disperbyk 190 dispersant, 12.5 weight percent TI-Pure R-902+ TiO2 pigment, 11.8 weight percent MINEX #10 filler, 0.8 weight percent Hydropalat WE 3220 surfactant, 0.2 weight percent Rheovis PU 1250 NC rheology modifier, and 16 weight percent water. This sample of the first component of the two-component acrylic urethane coating was tinted to off-white using PureOptions™ Colorants. The tinted first component composition comprised of 0.075% PureOptions™ B, 0.075% PureOptions™ C, 0.075% PureOptions™ I, and 99.775% of the first component composition, by weight. The tinted first component composition was blended with a second component comprising Basonat HW1180 PC water-emulsifiable aliphatic isocyanate at a mix ratio of 5:1 by volume. The textured side of a polyurethane foam composite board was wiped down with a soft cloth. Then, using a foam brush the coating composition was applied to the textured side of the polyurethane foam composite board with a foam brush. The coating composition was dried at ambient temperature for 5 minutes and then was placed in a 70° C. oven for 7 minutes. The coated polyurethane foam composite board was maintained overnight at room temperature. The dry adhesion of the coated polyurethane foam composite board was evaluated. The results appear in Table below.

Example 3

A first component composition of the two-part water-based acrylic urethane coating composition was prepared. The first component included 57 weight percent JONCRYL OH 8314 hydroxyl functional acrylic polymer emulsion, 0.2 weight percent FoamStar SI 2292 NC defoamer, 1.5 weight percent Disperbyk 190 dispersant, 12.5 weight percent TI-Pure R-902+ TiO2 pigment, 11.8 weight percent MINEX #10 filler, 0.8 weight percent Hydropalat WE 3220 surfactant, 0.2 weight percent Rheovis PU 1250 NC rheology modifier, and 16 weight percent water. This sample of the first component of the two-component acrylic urethane coating was tinted to off-white using PureOptions™ Colorants. The tinted first component composition comprised of 0.075% PureOptions™ B, 0.075% PureOptions™ C, 0.075% PureOptions™ I, and 99.775% of the first component composition, by weight. The tinted first component composition was blended with a second component comprising Basonat HW1180 PC water-emulsifiable aliphatic isocyanate at a mix ratio of 6:1 by volume. The textured side of a polyurethane foam composite board was wiped down with a soft cloth. Then, using a foam brush the coating composition was applied to the textured side of the polyurethane foam composite board with a foam brush. The coating composition was dried at ambient temperature for 5 minutes and then was placed in a 70° C. oven for 7 minutes. The coated polyurethane foam composite board was maintained overnight at room temperature. The dry adhesion of the coated polyurethane foam composite board was evaluated. The results appear in Table below.

Example 4

A first component composition of the two-part water-based acrylic urethane coating composition was prepared. The first component included 57 weight percent JONCRYL OH 8314 hydroxyl functional acrylic polymer emulsion, 0.2 weight percent FoamStar SI 2292 NC defoamer, 1.5 weight percent Disperbyk 190 dispersant, 12.5 weight percent TI-Pure R-902+ TiO2 pigment, 11.8 weight percent MINEX #10 filler, 0.8 weight percent Hydropalat WE 3220 surfactant, 0.2 weight percent Rheovis PU 1250 NC rheology modifier, and 16 weight percent water. This sample of the first component of the two-component acrylic urethane coating was tinted to off-white using PureOptions™ Colorants. The tinted first component composition comprised of 0.075% PureOptions™ B, 0.075% PureOptions™ C, 0.075% PureOptions™ I, and 99.775% of the first component composition, by weight. The tinted first component composition was blended with a second component comprising Basonat HW1180 PC water-emulsifiable aliphatic isocyanate at a mix ratio of 7:1 by volume. The textured side of a polyurethane foam composite board was wiped down with a soft cloth. Then, using a foam brush the coating composition was applied to the textured side of the polyurethane foam composite board with a foam brush. The coating composition was dried at ambient temperature for 5 minutes and then was placed in a 70° C. oven for 7 minutes. The coated polyurethane foam composite board was maintained overnight at room temperature. The dry adhesion of the coated polyurethane foam composite board was evaluated. The results appear in Table below.

Example 5

A first component composition of the two-part water-based acrylic urethane coating composition was prepared. The first component included 57 weight percent JONCRYL OH 8314 hydroxyl functional acrylic polymer emulsion, 0.2 weight percent FoamStar SI 2292 NC defoamer, 1.5 weight percent Disperbyk 190 dispersant, 12.5 weight percent TI-Pure R-902+ TiO2 pigment, 11.8 weight percent MINEX #10 filler, 0.8 weight percent Hydropalat WE 3220 surfactant, 0.2 weight percent Rheovis PU 1250 NC rheology modifier, and 16 weight percent water. This sample of the first component of the two-component acrylic urethane coating was tinted to off-white using PureOptions™ Colorants. The tinted first component composition comprised of 0.075% PureOptions™ B, 0.075% PureOptions™ C, 0.075% PureOptions™ I, and 99.775% of the first component composition, by weight. The tinted first component composition was blended with a second component comprising Basonat HW1180 PC water-emulsifiable aliphatic isocyanate at a mix ratio of 8:1 by volume. The textured side of a polyurethane foam composite board was wiped down with a soft cloth. Then, using a foam brush the coating composition was applied to the textured side of the polyurethane foam composite board with a foam brush. The coating composition was dried at ambient temperature for 5 minutes and then was placed in a 70° C. oven for 7 minutes. The coated polyurethane foam composite board was maintained overnight at room temperature. The dry adhesion of the coated polyurethane foam composite board was evaluated. The results appear in Table below.

TABLE

| Example | Mix Ratio (by volume) | ASTM D3359 rating, X-cut tape test, dry |
|---|---|---|
| 1 | 4 parts First Part to 1 part Second Part | 5A |
| 2 | 5 parts First Part to 1 part Second Part | 5A |
| 3 | 6 parts First Part to 1 part Second Part | 5A |
| 4 | 7 parts First Part to 1 part Second Part | 5A |
| 5 | 8 parts First Part to 1 part Second Part | 5A |

Example 6

A first component composition of the two-part water-based acrylic urethane coating composition was prepared. The first component included 57 weight percent JONCRYL OH 8314 hydroxyl functional acrylic polymer emulsion, 0.2 weight percent FoamStar SI 2292 NC defoamer, 1.5 weight percent Disperbyk 190 dispersant, 12.5 weight percent TI-Pure R-902+ TiO2 pigment, 11.8 weight percent MINEX #10 filler, 0.8 weight percent Hydropalat WE 3220 surfactant, 0.2 weight percent Rheovis PU 1250 NC rheology modifier, and 16 weight percent water. This sample of the first component of the two-component acrylic urethane coating was tinted to off-white using PureOptions™ Colorants. The tinted first component composition comprised of 0.075% PureOptions™ B, 0.075% PureOptions™ C, 0.075% PureOptions™ I, and 99.775% of the first component composition, by weight. The tinted first component composition was blended with a second component comprising Basonat HW1180 PC water-emulsifiable aliphatic isocyanate at a mix ratio of 8:1 by volume. The textured side of a polyurethane foam composite board was wiped down with a soft cloth. The coating composition was applied to the textured side of the polyurethane foam composite board with a foam brush. The coating composition was dried at ambient temperature for 5 minutes and then was placed in a 70° C. oven for 7 minutes. One-half of the board was placed in water for 24 hours, and the other half of the board was maintained dry overnight at room temperature. The same board was used for both wet and dry adhesion testing, since only half of the board had been subjected to water. The dry adhesion testing was done the same day as the wet adhesion testing.

Example 7

Example 7 was tested after having the inventive coating top-coated with water-based exterior house paint. The coated panel was prepared in the same manner as Example 6. Once the coat foam board was removed from the 70° C. oven, the board was left to sit at ambient temperature overnight. Using a foam brush Valspar Duramax high-hiding paint and primer/semi-gloss/Ultra White/Tint Base 1 was applied on top of the dried coating. The exterior house paint was left to dry at ambient temperature for 1 week before half of the board was placed in water for 24 hours. The same coated board was used for both wet and dry adhesion testing, since only one-half of the board had been subjected to water.

The dry adhesion testing was done the same day as the wet adhesion testing. The inventive coating composition exhibited excellent adhesion to the polyurethane foam composite board, and the water-based exterior house paint exhibited excellent adhesion to the underlying acrylic urethane coating composition layer.

TABLE

| Example | Component Description | Inventive Coating Mix Ratio (by volume) | ASTM D335 X-cut tape test Wet | dry |
|---|---|---|---|---|
| 6 | Inventive Coating Only | 8 parts First Part to 1 part Second Part | 5A | 5A |
| 7 | Inventive Coating and Top-coat of exterior house paint | 8 parts First Part to 1 part Second Part Topcoat = Valspar Duramax high-hiding paint and primer (semi-gloss) Ultra White tint base 1 | 5A | 5A |

Comparative Examples 8-10

Comparative Examples 8-10 are experiments that were performed with formulated water-based one-component hardboard siding coating compositions. Joncryl 1915 and 1921 acrylic resins were used in the sample coating compositions. Polyurethane foam composite siding panels were preconditioned by heating to 50° C. in an oven and removed. Preconditioning was carried out to optimize the formation of a film of the acrylic urethane coating composition on the surface of the polyurethane foam composite board. A hardboard primer was applied to the test surface of the polyurethane foam composite siding panel. The sample coating was applied to the polyurethane foam composite siding panels at a thickness of 10 mils drawdown on the smooth side of the panels using a drawdown bar. The coated panels were cured at 68° C. in an oven for 7 minutes. The panels were held at room temperature overnight. Panels were then placed in a tub of water coated side down for 1 hour. The coated panels were subject to adhesion testing in accordance with ASTM D3559. Results of the adhesion testing is set forth in the Table below. Adhesion to panels was very poor.

TABLE

| Example | Resin used | Sample Description | ASTM D3359 rating, X-cut tape test, dry |
|---|---|---|---|
| C8 | Joncryl 1921 | HARDBOARD PRIMER, 50 PVC Formula 32004 - 8A | 1A |
| C9 | Joncryl 1921 | HARDBOARD PRIMER, 35 PVC Formula32004 - 8B | 0A |
| C10 | Joncryl 1915 | HARDBOARD PRIMER, Formula 609-A | 0A |

Comparative Examples 11 and 12

Neat resins were evaluated for adhesion to the polyurethane foam composite siding panels. Joncryl U4190, an aliphatic polyurethane dispersion, was compared to the Joncryl 1921 acrylic emulsion to determine whether a water-based polyurethane would adhere better to the surface of the polyurethane foam composite siding panels than the acrylic emulsion. The resins were first tinted with 1% Colortrend B universal colorant to aid in visual examination. Each of the samples were brushed onto the smooth side of the test panel with a foam brush. The panels were dried at ambient temperature for 5 minutes and then were placed in a 70° C. oven for 60 minutes. The coated panels were cooled to ambient temperature after being removed from the oven and then were placed in a tub of tap water, coating side down, for 24 hours. The panels were tested for wet adhesion using the X-cut method in accordance with ASTM D3559. Results of the adhesion testing is set forth in the Table below. Adhesion to panels was very poor.

TABLE

| Example | Resin | Resin description | ASTM D3359 rating, X-cut tape test, wet adhesion to PUF composite siding board |
|---|---|---|---|
| C11 | Joncryl 1921 | Acrylic emulsion | 0A |
| C12 | Joncryl U4190 | polyurethane dispersion | 0A |

Comparative Examples 13-15

Further comparative examples were tested using acrylic resin dispersions and emulsions. Acronal® NX 3250 M is a self-crosslinking acrylic dispersion that is recommended for use over polyurethane foam roofs. Joncryl® 1532 is an acrylic emulsion that has excellent adhesion to a variety of substrates including plastics. Formulated coating samples were prepared using the resin or resin blend as specified by the manufacturer. The textured side of the polyurethane foam composite siding panel was first wiped with a soft cloth. The formulated coating was applied to the test panel with a foam brush with the grain of the board. The coating was dried at ambient temperature for 5 minutes, and then was placed in a 70° C. oven for 30 minutes. The board was cooled to ambient temperature after being removed from the oven. The test panel was then placed in a tub of tap water, coating side down, for 1 hour. The panels were tested for wet adhesion using the X-cut method in accordance with ASTM D3559. Results of the adhesion testing is set forth in the Table below. Comparative Example 15, which was a formulated coating composition containing a blend of Acronal NX 3250 M and Joncryl 1532 (Comparative Example 15) performed better than Acronal NX 3250 alone (Comparative Example 13) and Joncryl 1532 alone (Comparative Example 14). However, the performance of the coating composition of Comparative Example 15 is deemed insufficient to be used as a coating for polyurethane foam composite panels.

TABLE

| Example | Resin | Sample description | ASTM D3359 rating, X-cut tape test, wet adhesion to PUF composite siding board |
|---|---|---|---|
| C13 | Acronal NX 3250 M | % Solids = 62<br>PVC = 34<br>ZnO = 3.5% | 1A |
| C14 | Joncryl 1532 | % Solids = 61,<br>PVC = 34<br>Sample cured in oven an additional 30 minutes. | 1A |
| C15 | Resin blend<br>1 part Acronal NX3250 M<br>3 parts Joncryl 1532 | % Solids = 62<br>PVC = 34 | 3A |

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

The inevntion claimed is:

1. A two-component water-based acrylic urethane coating composition that is able to adhere to polyurethane foam board, the composition comprising:
    a first component comprising about 40 to about 80 weight percent of a hydroxyl functional acrylic polymer emulsion, and (ii) from about 2.5 to about 15 weight percent of pigment; and
    a second component comprising a water-emulsifiable isocyanate,
    wherein the first component and the second component are provided in respective volumes that correspond to a volume mixing ratio in a range of from 4:1 to 8:1.

2. The two-component water-based polyurethane coating composition of claim 1, wherein said acrylic polymer emulsion comprises a styrene-acrylic copolymer.

3. The two-component water-based polyurethane coating composition of claim 1, wherein said acrylic polymer emulsion comprises an ammonia salt of a styrene-acrylic copolymer.

4. The two-component water-based polyurethane coating composition of claim 1, wherein said water-emulsifiable isocyanate is selected from water-emulsifiable aliphatic isocyanates, water-emulsifiable cycloaliphatic isocyanates, water-emulsifiable araliphatic isocyanates and mixtures thereof.

5. The two-component water-based polyurethane coating composition of claim 4, wherein said water-emulsifiable isocyanate is an aliphatic isocyanate.

6. The two-component water-based polyurethane coating composition of claim 2, wherein said water-emulsifiable isocyanate is selected from water-emulsifiable aliphatic isocyanates, water-emulsifiable cycloaliphatic isocyanates, water-emulsifiable araliphatic isocyanates and mixtures thereof.

7. The two-component water-based polyurethane coating composition of claim 6, wherein said water-emulsifiable isocyanate is an aliphatic isocyanate.

8. The two-component water-based polyurethane coating composition of claim 3, wherein said water-emulsifiable isocyanate is selected from water-emulsifiable aliphatic isocyanates, water-emulsifiable cycloaliphatic isocyanates, water-emulsifiable araliphatic isocyanates and mixtures thereof.

9. The two-component water-based polyurethane coating composition of claim 8, wherein said water-emulsifiable isocyanate is an aliphatic isocyanate.

10. A coated polyurethane foam board comprising:
   a base polyurethane foam board comprising first and second opposite facing major surfaces and a thickness extending between said first and second opposite facing major surfaces; and
   the urethane coating composition of claim 1, which is applied to at least a portion of at least one of said first and second opposite facing surfaces of said polyurethane foam board.

11. The coated polyurethane foam board of claim 10, wherein said acrylic polymer comprises a styrene-acrylic copolymer.

12. The coated polyurethane foam board of claim 11, wherein said acrylic polymer comprises an ammonia salt of said styrene-acrylic copolymer.

13. The coated polyurethane foam board of claim 10, wherein said water-emulsifiable isocyanate is selected from water-emulsifiable aliphatic isocyanates, wateremulsifiable cycloaliphatic isocyanates, water-emulsifiable araliphatic isocyanates and mixtures thereof.

14. The coated polyurethane foam board of claim 13, wherein said water-emulsifiable is an aliphatic isocyanate.

15. The coated polyurethane foam board of claim 11, wherein said water-emulsifiable isocyanate is selected from water-emulsifiable aliphatic isocyanates, wateremulsifiable cycloaliphatic isocyanates, water-emulsifiable araliphatic isocyanates and mixtures thereof.

16. The coated polyurethane foam board of claim 15, wherein said water-emulsifiable aliphatic isocyanate.

17. The coated polyurethane foam board of claim 12, wherein said water-emulsifiable isocyanate is selected from water-emulsifiable aliphatic isocyanates, wateremulsifiable cycloaliphatic isocyanates, water-emulsifiable araliphatic isocyanates and mixtures thereof.

18. The coated polyurethane foam board of claim 17, wherein said water-emulsifiable is an aliphatic isocyanate.

19. A building wall comprising:
   a frame and a coated polyurethane foam board attached to said frame,
      said coated polyurethane foam board having opposite facing first and second surfaces and a thickness extending between said first and second opposite facing surfaces, and the urethane coating composition of claim 1, which is adhered to at least a portion of at least one of said first and second opposite facing major surfaces of said polyurethane foam board.

20. The two-component water-based polyurethane coating composition of claim 1, wherein the second component comprises at least one water-emulsifiable isocyanate in solvent.

21. The two-component water-based polyurethane coating composition of claim 1, wherein the solids content of the first component composition is from about 45 to about 55 percent by weight.

22. The two-component water-based polyurethane coating composition of claim 1, wherein the solids content of a mixture of the first and second component compositions is from about 40 to about 45 percent by volume.

23. The two-component water-based polyurethane coating composition of claim 1, wherein the solids content of a mixture of the first and second component compositions is from about 50 to about 55 percent by weight.

24. The two-component water-based polyurethane coating composition of claim 1, wherein the density of the first component composition is in the range of about 1 to about 1.5 kg/L.

25. The two-component water-based polyurethane coating composition of claim 1, wherein the density of a mixture of the first and second component compositions is in the range of about 1 to about 1.3 kg/L.

26. The two-component water-based polyurethane coating composition of claim 1, wherein the volatile organic content (VOC) of the first component composition is less than 100 g/L.

27. The two-component water-based polyurethane coating composition of claim 1, wherein the first component comprises from about 5 to about 25 weight percent water.

28. The two-component water-based polyurethane coating composition of claim 1, wherein the first component comprises from about 7.5 to about 15 percent by weight of the pigment.

29. The two-component colored water-based acrylic polyurethane coating composition of claim 1, wherein the first component further comprises from about 5 to about 25 weight percent of filler.

30. The two-component colored water-based acrylic polyurethane coating composition of claim 1, wherein the first component further comprises from about 10 to about 20 weight percent of filler.

31. The two-component colored water-based acrylic polyurethane coating composition of claim 1, wherein the water-emulsifiable isocyanate is an oligomeric isocyanate.

* * * * *